US009287710B2

(12) United States Patent
Talkin et al.

(10) Patent No.: US 9,287,710 B2
(45) Date of Patent: *Mar. 15, 2016

(54) SUPPLYING GRID ANCILLARY SERVICES USING CONTROLLABLE LOADS (75) Inventors: David Talkin, Newton, MA (US); Alec Brooks, Pasadena, CA (US)

(73) Assignee: Google Inc., Mountain View, CA (US)

( * ) Notice: Subject to any disclaimer, the term of this patent is extended or adjusted under 35 U.S.C. 154(b) by 803 days.

This patent is subject to a terminal disclaimer.

(21) Appl. No.: 13/466,729

(22) Filed: May 8, 2012

(65) Prior Publication Data

US 2012/0217803 A1    Aug. 30, 2012

Related U.S. Application Data (63) Continuation of application No. 12/484,999, filed on Jun. 15, 2009, now Pat. No. 8,178,997.

(51) Int. Cl.
| H02J 4/00 | (2006.01) |
| H02J 3/14 | (2006.01) |
| G06Q 50/06 | (2012.01) |
| H02J 13/00 | (2006.01) |

(52) U.S. Cl.
CPC . *H02J 3/14* (2013.01); *G06Q 50/06* (2013.01); *H02J 13/0079* (2013.01); *H02J 13/0086* (2013.01); *Y02B 70/3225* (2013.01); *Y04S 20/222* (2013.01); *Y04S 20/224* (2013.01); *Y10T 307/484* (2015.04)

(58) Field of Classification Search
CPC combination set(s) only.
See application file for complete search history.

(56) References Cited

U.S. PATENT DOCUMENTS

| 4,360,849 A | 11/1982 | Harris et al. |
| 4,954,945 A | 9/1990 | Inoue |
| 5,119,014 A | 6/1992 | Kronberg |
| 5,339,445 A | 8/1994 | Gasztonyi |
| 5,432,947 A | 7/1995 | Doi |
| 5,458,991 A | 10/1995 | Severinsky |
| 5,552,640 A | 9/1996 | Sutton et al. |

(Continued)

FOREIGN PATENT DOCUMENTS

| EP | 1 439 622 A1 | 7/2004 |
| KR | 10-2002-0032128 | 5/2002 |

(Continued)

OTHER PUBLICATIONS

U.S. Appl. No. 12/690,022, filed Jan. 19, 2010, Sudindranath et al.

(Continued)

*Primary Examiner* — Jared Fureman
*Assistant Examiner* — Aqeel Bukhari
(74) *Attorney, Agent, or Firm* — Fish & Richardson P.C.

(57) ABSTRACT

A method includes determining a desired power draw for a plurality of loads connected to an electrical grid, each of the plurality of loads connected to the electrical grid through a load supply control and being able to obtain a desired amount of energy from the grid in a desired time period, and transmitting a plurality of instructions through a communication network to a plurality of load supply controls to cause at least some of the loads in the plurality of loads to receive power from the electrical grid at different rates than other loads of the plurality of loads such that the desired power draw is obtained and such that each load of the plurality of loads receives its corresponding desired amount of energy in the desired time period.

20 Claims, 3 Drawing Sheets

(56) References Cited

U.S. PATENT DOCUMENTS

| | | | |
|---|---|---|---|
| 5,579,522 A | 11/1996 | Christeson et al. | |
| 5,694,307 A | 12/1997 | Murugan | |
| 5,694,607 A | 12/1997 | Dunstan et al. | |
| 5,828,568 A | 10/1998 | Sunakawa et al. | |
| 5,844,884 A | 12/1998 | Szlenski | |
| 5,856,776 A | 1/1999 | Armstrong et al. | |
| 5,952,617 A | 9/1999 | Bergstrom | |
| 6,009,177 A | 12/1999 | Sudia | |
| 6,055,640 A | 4/2000 | Kageshima et al. | |
| 6,141,192 A | 10/2000 | Garzon | |
| 6,223,205 B1 | 4/2001 | Harchol-Balter et al. | |
| 6,289,684 B1 | 9/2001 | Guidry, II et al. | |
| 6,345,240 B1 | 2/2002 | Havens | |
| 6,374,627 B1 | 4/2002 | Schumacher et al. | |
| 6,429,706 B1 | 8/2002 | Amin et al. | |
| 6,487,509 B1 | 11/2002 | Aisa | |
| 6,496,366 B1 | 12/2002 | Coglitore et al. | |
| 6,506,111 B2 | 1/2003 | Sharp et al. | |
| 6,513,145 B1 | 1/2003 | Venkitakrishnan | |
| D473,225 S | 4/2003 | Coglitore et al. | |
| 6,559,559 B2 | 5/2003 | Cratty | |
| D475,705 S | 6/2003 | Coglitore et al. | |
| 6,584,559 B1 | 6/2003 | Huh | |
| 6,594,771 B1 | 7/2003 | Koerber et al. | |
| 6,625,737 B1 | 9/2003 | Kissell | |
| 6,652,373 B2 | 11/2003 | Sharp et al. | |
| 6,652,374 B2 | 11/2003 | Sharp et al. | |
| 6,667,891 B2 | 12/2003 | Coglitore et al. | |
| 6,668,565 B1 | 12/2003 | Johnson et al. | |
| 6,721,672 B2 | 4/2004 | Spitaels et al. | |
| 6,741,467 B2 | 5/2004 | Coglitore et al. | |
| 6,768,222 B1 | 7/2004 | Ricks | |
| 6,770,810 B2 | 8/2004 | Wiebe et al. | |
| 6,775,787 B2 | 8/2004 | Greene | |
| 6,785,827 B2 | 8/2004 | Layton et al. | |
| 6,804,616 B2 | 10/2004 | Bodas | |
| 6,822,859 B2 | 11/2004 | Coglitore et al. | |
| 6,824,362 B2 | 11/2004 | Dodson, III | |
| 6,834,354 B1 | 12/2004 | Togawa | |
| 6,847,995 B1 | 1/2005 | Hubbard et al. | |
| 6,850,408 B1 | 2/2005 | Coglitore et al. | |
| 6,859,366 B2 | 2/2005 | Fink | |
| 6,867,570 B2 | 3/2005 | Vithayathil et al. | |
| 6,880,349 B2 | 4/2005 | Johnson et al. | |
| 6,901,521 B2 | 5/2005 | Chauvel et al. | |
| 6,904,534 B2 | 6/2005 | Koenen | |
| 6,907,395 B1 | 6/2005 | Hunt et al. | |
| 6,915,438 B2 | 7/2005 | Boros | |
| 6,935,130 B2 | 8/2005 | Cheng et al. | |
| 6,937,947 B2 | 8/2005 | Trembley | |
| 6,967,283 B2 | 11/2005 | Rasmussen et al. | |
| 6,969,922 B2 | 11/2005 | Welches et al. | |
| 6,980,433 B2 | 12/2005 | Fink | |
| 6,986,066 B2 | 1/2006 | Morrow et al. | |
| 7,010,363 B2 * | 3/2006 | Donnelly et al. | 700/19 |
| 7,010,704 B2 | 3/2006 | Yang et al. | |
| 7,011,576 B2 | 3/2006 | Sharp et al. | |
| 7,020,586 B2 | 3/2006 | Snevely | |
| 7,036,035 B2 | 4/2006 | Allison et al. | |
| 7,046,514 B2 | 5/2006 | Fink et al. | |
| 7,058,524 B2 | 6/2006 | Hayes et al. | |
| 7,082,541 B2 | 7/2006 | Hammond et al. | |
| 7,099,784 B2 | 8/2006 | Spitaels et al. | |
| 7,123,477 B2 | 10/2006 | Coglitore et al. | |
| 7,127,625 B2 | 10/2006 | Farkas et al. | |
| 7,136,725 B1 | 11/2006 | Paciorek et al. | |
| 7,145,772 B2 | 12/2006 | Fink | |
| 7,161,557 B2 | 1/2007 | Thornton | |
| 7,166,930 B2 | 1/2007 | Young | |
| 7,173,820 B2 | 2/2007 | Fink et al. | |
| 7,173,821 B2 | 2/2007 | Coglitore | |
| 7,178,147 B2 | 2/2007 | Benhase et al. | |
| 7,203,849 B2 | 4/2007 | Dove | |
| 7,203,852 B2 | 4/2007 | Cohen et al. | |
| 7,203,943 B2 | 4/2007 | Shaffer | |
| 7,210,048 B2 | 4/2007 | Bodas | |
| 7,222,030 B2 | 5/2007 | Banginwar et al. | |
| 7,222,246 B2 | 5/2007 | Pomaranski et al. | |
| 7,228,441 B2 | 6/2007 | Fung | |
| 7,240,225 B2 | 7/2007 | Brewer et al. | |
| 7,242,945 B2 | 7/2007 | Reddi | |
| 7,272,517 B1 | 9/2007 | Brey et al. | |
| 7,272,733 B2 | 9/2007 | Pomaranski et al. | |
| 7,278,273 B1 | 10/2007 | Whitted et al. | |
| 7,305,282 B2 | 12/2007 | Chen | |
| 7,313,503 B2 | 12/2007 | Nakagawa et al. | |
| 7,349,828 B1 | 3/2008 | Ranganathan et al. | |
| 7,383,137 B2 | 6/2008 | Hanebutte | |
| 7,383,454 B2 | 6/2008 | Loffink et al. | |
| 7,420,293 B2 | 9/2008 | Donnelly et al. | |
| 7,421,599 B2 | 9/2008 | Bahali et al. | |
| 7,430,675 B2 | 9/2008 | Lee | |
| 7,444,526 B2 | 10/2008 | Felter et al. | |
| 7,457,976 B2 | 11/2008 | Bolan et al. | |
| 7,461,273 B2 | 12/2008 | Moore et al. | |
| 7,461,274 B2 | 12/2008 | Merkin | |
| 7,467,306 B2 | 12/2008 | Cartes et al. | |
| 7,467,311 B2 | 12/2008 | Bahali et al. | |
| 7,469,351 B2 | 12/2008 | Baba et al. | |
| 7,487,058 B2 | 2/2009 | Gross et al. | |
| 7,493,235 B2 | 2/2009 | Artman et al. | |
| 7,493,503 B2 | 2/2009 | Aldereguia et al. | |
| 7,496,772 B1 | 2/2009 | Nguyen | |
| 7,499,279 B2 | 3/2009 | Campbell et al. | |
| 7,511,959 B2 | 3/2009 | Belady et al. | |
| 7,511,960 B2 | 3/2009 | Hillis et al. | |
| 7,514,815 B2 | 4/2009 | Paik et al. | |
| 7,525,207 B2 | 4/2009 | Clidaras et al. | |
| 7,529,086 B2 | 5/2009 | Fink et al. | |
| 7,549,069 B2 | 6/2009 | Ishihara et al. | |
| 7,549,070 B2 | 6/2009 | Zwinger et al. | |
| 7,555,666 B2 | 6/2009 | Brundridge et al. | |
| 7,561,977 B2 | 7/2009 | Horst et al. | |
| 7,581,125 B2 | 8/2009 | Ranganathan et al. | |
| 7,595,642 B2 | 9/2009 | Doyle | |
| 7,633,181 B2 | 12/2009 | Gross et al. | |
| 7,644,148 B2 | 1/2010 | Ranganathan et al. | |
| 7,646,590 B1 | 1/2010 | Corhodzic et al. | |
| 7,647,516 B2 | 1/2010 | Ranganathan et al. | |
| 7,675,740 B2 | 3/2010 | Rasmussen et al. | |
| 7,698,580 B2 | 4/2010 | Schindler et al. | |
| 7,701,714 B2 | 4/2010 | Shabany | |
| 7,702,931 B2 | 4/2010 | Goodrum et al. | |
| 7,705,484 B2 * | 4/2010 | Horst | 307/35 |
| 7,726,144 B2 | 6/2010 | Larson | |
| 7,756,652 B2 | 7/2010 | Lewis et al. | |
| 7,774,630 B2 | 8/2010 | Hatasaki et al. | |
| 7,783,906 B2 | 8/2010 | Turner et al. | |
| 7,783,909 B2 | 8/2010 | Hatasaki et al. | |
| 7,818,594 B2 | 10/2010 | Gorbatov et al. | |
| 7,825,536 B2 | 11/2010 | Jacobson et al. | |
| 7,827,421 B2 | 11/2010 | Brewer et al. | |
| 7,840,824 B2 | 11/2010 | Baba et al. | |
| 7,844,839 B2 | 11/2010 | Palmer et al. | |
| 7,856,549 B2 | 12/2010 | Wheeler | |
| 7,863,769 B2 | 1/2011 | Busdiecker et al. | |
| 7,904,287 B2 | 3/2011 | Lefurgy et al. | |
| 7,996,839 B2 | 8/2011 | Farkas et al. | |
| 8,010,215 B2 | 8/2011 | Borkenhagen et al. | |
| 8,091,087 B2 | 1/2012 | Ali et al. | |
| 8,178,997 B2 * | 5/2012 | Talkin et al. | 307/41 |
| 8,214,843 B2 | 7/2012 | Boss et al. | |
| 8,595,515 B1 | 11/2013 | Weber | |
| 8,601,287 B1 | 12/2013 | Weber | |
| 2001/0003207 A1 | 6/2001 | Kling et al. | |
| 2002/0007463 A1 | 1/2002 | Fung | |
| 2002/0065049 A1 | 5/2002 | Chauvel et al. | |
| 2002/0194517 A1 | 12/2002 | Cohen et al. | |
| 2003/0005339 A1 | 1/2003 | Cohen et al. | |
| 2003/0048647 A1 | 3/2003 | Sadler et al. | |
| 2003/0055969 A1 | 3/2003 | Begun et al. | |
| 2003/0133263 A1 | 7/2003 | Shu | |
| 2003/0197428 A1 | 10/2003 | Hatton et al. | |
| 2003/0237008 A1 | 12/2003 | Freevol et al. | |

(56) References Cited

U.S. PATENT DOCUMENTS

| | | |
|---|---|---|
| 2004/0004538 A1 | 1/2004 | Manis et al. |
| 2004/0020224 A1 | 2/2004 | Bash et al. |
| 2004/0150374 A1 | 8/2004 | Kraus |
| 2004/0163001 A1 | 8/2004 | Bodas |
| 2004/0167732 A1 | 8/2004 | Spitaels et al. |
| 2004/0184232 A1 | 9/2004 | Fink |
| 2004/0223300 A1 | 11/2004 | Fink et al. |
| 2004/0228087 A1 | 11/2004 | Coglitore |
| 2004/0247961 A1 | 12/2004 | Edlund |
| 2004/0265662 A1 | 12/2004 | Brignone et al. |
| 2005/0012395 A1 | 1/2005 | Eckroad et al. |
| 2005/0036248 A1 | 2/2005 | Klikic et al. |
| 2005/0071092 A1 | 3/2005 | Farkas et al. |
| 2005/0071699 A1 | 3/2005 | Hammond et al. |
| 2005/0088201 A1 | 4/2005 | Devlin |
| 2005/0094330 A1 | 5/2005 | Guenther et al. |
| 2005/0099750 A1 | 5/2005 | Takahashi et al. |
| 2005/0099770 A1 | 5/2005 | Fink |
| 2005/0102544 A1 | 5/2005 | Brewer et al. |
| 2005/0132239 A1 | 6/2005 | Athas et al. |
| 2005/0165511 A1 | 7/2005 | Fairlie |
| 2005/0170770 A1 | 8/2005 | Johnson et al. |
| 2005/0171753 A1 | 8/2005 | Rosing et al. |
| 2005/0177755 A1 | 8/2005 | Fung |
| 2005/0200205 A1 | 9/2005 | Winn et al. |
| 2005/0240934 A1 | 10/2005 | Patterson et al. |
| 2006/0007653 A1 | 1/2006 | Fink |
| 2006/0020832 A1 | 1/2006 | Hung |
| 2006/0082263 A1 | 4/2006 | Rimler et al. |
| 2006/0085097 A1 | 4/2006 | Courtney |
| 2006/0098371 A1 | 5/2006 | Wambsganss et al. |
| 2006/0107262 A1 | 5/2006 | Bodas et al. |
| 2006/0187636 A1 | 8/2006 | Fink et al. |
| 2006/0259622 A1 | 11/2006 | Moore et al. |
| 2006/0284489 A1 | 12/2006 | Gross et al. |
| 2007/0016814 A1 | 1/2007 | Rusu et al. |
| 2007/0038414 A1 | 2/2007 | Rasmussen et al. |
| 2007/0050644 A1 | 3/2007 | Merkin |
| 2007/0052294 A1 | 3/2007 | Kraus |
| 2007/0076373 A1 | 4/2007 | Fink |
| 2007/0086364 A1 | 4/2007 | Ellis et al. |
| 2007/0089446 A1 | 4/2007 | Larson et al. |
| 2007/0143760 A1 | 6/2007 | Chan et al. |
| 2007/0150215 A1 | 6/2007 | Spitaels et al. |
| 2007/0168161 A1 | 7/2007 | Vellore et al. |
| 2007/0198383 A1 | 8/2007 | Dow et al. |
| 2007/0220292 A1 | 9/2007 | Ishihara et al. |
| 2007/0274035 A1 | 11/2007 | Fink et al. |
| 2007/0291433 A1 | 12/2007 | Ziegler et al. |
| 2007/0300083 A1 | 12/2007 | Goodrum et al. |
| 2008/0030078 A1 | 2/2008 | Whitted et al. |
| 2008/0039979 A1 | 2/2008 | Bridges et al. |
| 2008/0062647 A1 | 3/2008 | Hillis et al. |
| 2008/0064317 A1 | 3/2008 | Yates et al. |
| 2008/0094797 A1 | 4/2008 | Coglitore et al. |
| 2008/0106241 A1 | 5/2008 | Deaver et al. |
| 2008/0114997 A1 | 5/2008 | Chin |
| 2008/0123288 A1 | 5/2008 | Hillis |
| 2008/0165714 A1 | 7/2008 | Dettinger et al. |
| 2008/0168282 A1 | 7/2008 | Brundridge |
| 2008/0172312 A1 | 7/2008 | Synesiou et al. |
| 2008/0234873 A1 | 9/2008 | Gorbatov et al. |
| 2008/0278003 A1 | 11/2008 | Pouchet et al. |
| 2009/0050591 A1 | 2/2009 | Hart et al. |
| 2009/0070611 A1 | 3/2009 | Bower et al. |
| 2009/0138100 A1 | 5/2009 | Khorramshahi |
| 2009/0138219 A1 | 5/2009 | Bletsch et al. |
| 2009/0138313 A1 | 5/2009 | Morgan et al. |
| 2009/0187776 A1 | 7/2009 | Baba et al. |
| 2009/0195977 A1 | 8/2009 | Fink et al. |
| 2009/0241578 A1 | 10/2009 | Carlson et al. |
| 2009/0259345 A1 | 10/2009 | Kato et al. |
| 2009/0281846 A1 | 11/2009 | Rose |
| 2010/0050008 A1 | 2/2010 | Allalouf et al. |
| 2010/0088205 A1 | 4/2010 | Robertson |
| 2010/0100250 A1 | 4/2010 | Budhraja et al. |
| 2010/0138174 A1 | 6/2010 | Archibald et al. |
| 2010/0262842 A1 | 10/2010 | Kansal et al. |
| 2010/0314942 A1 | 12/2010 | Talkin et al. |
| 2010/0318827 A1 | 12/2010 | Shah et al. |
| 2011/0106326 A1 | 5/2011 | Anunobi et al. |
| 2012/0066519 A1 | 3/2012 | Ei-Essawy et al. |
| 2012/0110350 A1 | 5/2012 | Horvath et al. |
| 2012/0144219 A1 | 6/2012 | Salahshour et al. |
| 2012/0181869 A1 | 7/2012 | Chapel et al. |

FOREIGN PATENT DOCUMENTS

| | | |
|---|---|---|
| KR | 10-2008-0019938 | 5/2008 |
| WO | 01/20496 A1 | 3/2001 |
| WO | 2007/064265 A1 | 6/2007 |
| WO | 2007/082351 A1 | 7/2007 |

OTHER PUBLICATIONS

EnerNOC Deploys Industry's First Presence-Enabled Smart Grid Technology. GlobeNewswire, Inc. report [online]. EnerNOC, Inc., 2009 [retrieved on Jan. 5, 2010]. Retrieved from the Internet: <URL: http://files.shareholder.com/downloads/ENOC/0x0x291277/ 4c6d4655-cfe6-4e01-a690-ec811ee3194e/ENOC_News_2009_ 4_30_General_Releases.pdf>.

International Search Report and Written Opinion for PCT Application No. PCT/US2010/038621, mailed Feb. 18, 2011, 10 pages.

"Protect High-Density Equipment From Thermal Damage—Guaranteed," APC Currents, Sep. 2007, 18(4):3 pages.

'Advanced Micro Devices, Inc.,' [online]. "AMD Opteron Processor with Direct Connect Architecture," Sep. 2006 [retrieved on Sep. 3, 2009]. Retrieved from the Internet: http://enterprise.amd.com/downloads/2P_Power_PID_41497 , 2 pages.

'Analog Devices' [online]. "Intelligent Temperature Monitor and PWM Fan Controller," 2003, [retrieved on Oct. 24, 2006]. Retrieved from the Internet: www.analog.com/UploadedFiles/Data_Sheets/ ADM1030.pdf#xml=http://search.analog.com/search/pdfPainter. aspx?url=http://www.analog.com/UploadedFiles/Data_Sheets/ ADM1030.pdf&fterm=Intelligent&fterm=Temperature &fterm=Intelligent_Temperature&la=en , 28 pages.

'Electronic Design' [online]. "Low-cost fan manager for power-supply applications," 2006, [retrieved on Oct. 23, 2006]. Retrieved from the internet: www.elecdesign.com/Articles/Index. cfm?ArticleID=6281, 3 pages.

'Intel Corporation' [online]. "Dual-Core Intel® Xeon Processor LV and ULV Datasheet," [online]. Sep. 2006 [Retrieved on Sep. 3, 2009]. Retrieved from the Internet: http://download.intel.com/design/ intarch/datashts/31139101, 72 pages.

'Maxim/Dallas Semiconductor' [online]. "Circuit Converts PWM Fan Drive to Linear and Reduces Acoustic Noise," 2006, [retrieved on Oct. 23, 2006]. Retrieved from the Internet: www.maxim-ic.com/ appnotes.cfm/an_pk/3530, 3 pages.

'Micron Technology, Inc.' [online]. "Calculating Memory System Power for DDR," 2001 [Retrieved on Sep. 3, 2009]. Retrieved from the Internet: http://download.micron.com/pdf/technotes/ddr/ TN4603, 26 pages.

'National Semiconductor' [online]. "LM64—+− 1C Remote Diode Temperature Sensor with PWM Fan Control and 5 GPIO's," 2006, [retrieved on Oct. 23, 2006]. Retrieved from the Internet: http://www. elecdesign.com/Articles/Index.cfm?ArticleID=6281, 3 pages.

'Seagate Technology LLC' [online]. "Product Manual Barracuda 7200.7," Sep. 2005 [Retrieved on Sep. 3, 2009]. Retrieved from the Internet: http://www.seagate.com/support/disc/manuals/ata/ cuda7200pm, 54 pages.

'Slashdot' [online]. "Building an Energy Efficient Datacenter?" [retrieved on Sep. 6, 2007]. 1997-2007, 25 pages.

'Sun' [online] "Project Blackbox-Scenarios," Retrieved Oct. 19, 2006, Retrieved from the internet: http://www.sun.com/emrkt/ blackbox/scenarios.jsp , 7 pages.

'Sun' [online]. "Project Blackbox" [retrieved Oct. 19, 2006]. Retrieved from the internet http://www.sun.com/emrkt/blackbox/index.jsp , 3 pages.

(56) References Cited

OTHER PUBLICATIONS

'T10 Project 1142D—Working Draft SCSI Parallel Interface-2' [online]. American National Standard, Apr. 13, 1998, [retrieved on Oct. 23, 2006]. Retrieved from the Internet: www.t10.org/ftp/t10/drafts/spi2/spi2r20b, 3 pages.

"Advanced Power Management with Dell OpenManagement Power Center," Dell Inc., Mar. 2012, 21 pages.

"Cisco Data Center Infrastructure 2.5 Design Guide," Cisco Systems, Inc., Dec. 6, 2007, 180 pages.

"Data Center Design and Implementation with Cisco Catalyst 6500 Services Modules," Cisco Systems, Inc., 2004, 88 pages.

"Data Center Power and Cooling—White Paper," Cisco, Aug. 2011, 25 pages.

"Federal Energy Regulatory Commission Staff Preliminary Assessment of the North American Electric Reliability Council's Proposed Mandatory Reliability Standards," Department of Energy—Federal Energy Regulatory Commission, May 11, 2006, 137 pages.

"HP Power Advisor Utility: A Tool for Estimating Power Requirements for HP ProLiant Server Systems—Technology Brief," Hewlett Packard, Aug. 2009, 22 pages.

"Optimizing Facility Operation in High Density Data Center Environments—Technology Brief," Hewlett Packard, Aug. 2007, 26 pages.

"Power Factor Correction: A Guide for the Plant Engineer," Cutler-Hammer, Jul. 2004, 26 pages.

"Principles for Efficient and Reliable Reactive Power Supply and Consumption," Federal Energy Regulatory Commission Staff Report, Feb. 4, 2005, 177 Pages.

"Principles for Efficient and Reliable Reactive Power Supply and Consumption," United States of America Before the Federal Energy Regulatory Commission, Mar. 8, 2005, 8 pages.

"Reducing Data Center Energy Consumption," Intel Corporation, White Paper, 2008, 8 pages.

"Regulatory Studies Program," Mercatus Center at George Mason University, 13 pages.

"Unified Physical Infrastructure (UPI) Strategies for Data Center Networking," Panduit, White Paper, Jul. 2007, 15 pages.

"Your Data Center: Powered by Sentilla," Sentilla Corporation, 2012, 4 pages.

Barroso et al., "Web Search for a Planet: The Google Cluster Architecture," IEEE Micro, Mar./Apr. 2003, 23(2):22-28.

Barroso, "The Price of Performance: An Economic Case for Chip Multiprocessing," ACM Queue, Sep. 2005, 3(7):49-53.

Bean et al., "Proper Sizing of IT Power and Cooling Loads White Paper" The Green Grid, 2009, 10 pages.

Bohrer et al., "The Case for Power Management in Web Servers," Power Aware Computing, 2002, pp. 261-289.

Burkhart, "FERC Takes on Reactive Power," Spark, Mar. 2005, Letter 15, 10 pages.

Carrera et al., "Conserving Disk Energy in Network Servers," ICS 2003: Proceedings of the 17th annual international conference on Supercomputing, Jun. 23-26, 2003, 14 pages.

Chan and More, "Measuring Power in your Data Center," [White Paper], Uptime Institute IT Symposium, 2009, 5 pages.

Chase et al., "Managing Energy and Server Resources in Hosting Centers," SOSP 2001: Proceedings of the eighteenth ACM symposium on Operating systems principles, 2001, pp. 103-116.

Computers and Knurr, "Energy Efficient Infrastructures for Data Centers," White Paper, Jul. 2007, 16 pages.

Contreras and Martonsi, "Power Prediction for Intel XScale Processors Using Performance Monitoring Unit Events," ISLPED 2005: Proceedings of the 2005 international symposium on Low power electronics and design, Aug. 8-10, 2005, pp. 221-226.

Conventional PCI 2.3—An Evolution of the Conventional PCI Local Bus Specification. [online]. PCI-SIG, Mar. 29, 2002 [Retrieved on Sep. 16, 2009]. Retrieved from the Internet: http://www.pcisig.com/members/downloads/specifications/conventional/conventional_pci_2_3, 328 pages.

Cringley, "Google-Mart: Sam Walton Taught Google More About How to Dominate the Internet Than Microsoft Ever Did," I, Cringely—The Pulpit, Nov. 17, 2005, 3 pages.

CUSC V1.3, "CUSC-Schedule 3," Apr. 2006, 65 pages.

Dean and Ghemawat., "MapReduce: Simplified Data Processing on Large Clusters," Communications of the ACM, Jan. 2008, 51(1):107-113.

Earley et al., "645.5 Supply Circuits and Interconnecting Cables," 2005 Ed., National Electrical Code Handbook, National Fire Protection Association, pp. 956-957.

Economou et al., "Full-System Power Analysis and Modeling for Server Environments" [online]. 2006 [Retrieved on Sep. 16, 2009]. Retrieved from the Internet: http://csl.stanford.edu/~christos/publications/2006.mantis.mobs, 8 pages.

Fan et al., "Power Provisioning for a Warehouse-sized Computer;" In Proceedings of the ACM International Symposium on Computer Architecture, Jun. 2007, 11 pages.

Felter et al., "A Performance-Conserving Approach for Reducing Peak Power Consumption in Server Systems," In ICS 2005: Proceedings of the 19th Annual International Conference on Supercomputing, Jun. 20-22, 2005, pp. 293-302.

Femal et al., "Boosting Data Center Performance Through Non-Uniform Power Allocation", IEEE Computer Society, Jun. 2005, pp. 1-12.

Femal et al., "Safe Overprovisioning: Using Power Limits to Increase Aggregate Throughput," 4th International Workshop on Power Aware Computer Systems (PACS 2004), Dec. 2004, pp. 150-164.

Filani et al., "Dynamic Data Center Power Management: Trends, Issues, and Solutions," Intel Technology Journal. Feb. 21, 2008, 12(1):59-67.

Gwennap, "AppliedMicro's X-Gene: Minimizing Power in Data-Center Servers," The Linley Group, Jul. 2012, 9 pages.

Hamilton, "Commodity Data Center Design" Microsoft Corp, Apr. 17, 2007, 11 pages.

Hamilton, "An Architecture for Modular Data Centers," Microsoft Corp, CIDR 2007. 3rd Biennial Conference on Innovative Data Systems Research (CIDR), Jan. 7-10, 2007, pp. 306-313.

Heath et al., "Mercury and Freon: Temperature Emulation and Management for Server Systems," In International Conference on Architectural Support for Programming Languages and Operating Systems (ASPLOS '06), Oct. 21-25, 2006, pp. 106-116.

HP Enterprise Configurator. [online]. Hewlett-Packard Development Company, 2006 [retrieved on Sep. 3, 2009]. Retrieved from the Internet: http://h30099.www3.hp.com/configurator/powercalcs.asp, 2 pages.

Intel Xeon Processor with 512-KB L2 Cache at 1.80 GHz to 3 GHz Datasheet. [online]. Intel Corporation, Mar. 2003 [Retrieved on Sep. 24, 2009]. Retrieved from the Internet: http://download.intel.com/design/Xeon/datashts/29864206.pdf, 129 pages.

Jackson et al., "Data Center Power Requirements: Measurements from Silicon Valley," Energy 28, 2003, pp. 837-850.

Jiang et al, "Power Aware Job Scheduling with Quality of Service Guarantees: A Preliminary Study," Proceedings of the Second International Symposium on Networking and Network Security, Apr. 2010, 4 pages.

Lee, "Peeling the Power Onion," CERCS IAB Workshop, Apr. 26, 2010, 27 pages.

Matter, 'Weblog' [online]. "The Industrial Revolution, Finally," Retrieved from the internet: http://blogs.sun.com/Gregp/date/200610, Oct. 17, 2006, 5 pages.

Meisner and Wenisch, "Peak Power Modeling for Data Center Servers with Switched-Mode Power Supplies," ISLPED 2010, Aug. 18-20, 2010, 6 pages.

Moore et al., "Data Center Workload Monitoring, Analysis, and Emulation," In Eighth Workshop on Computer Architecture Evaluation using Commercial Workloads, Feb. 2005, 8 pages.

Moore et al., "Making Scheduling "Cool": Temperature-Aware Workload Placement in Data Centers," USENIX Annual Technical Conference, Apr. 10-15, 2005, pp. 61-74.

Rackable Systems, "Rackable Systems Contcentro Modular Data Center High Density, High Efficiency Mobile Computing," Datasheet 2007, 1 page.

(56) References Cited

OTHER PUBLICATIONS

Rackable Systems, "Thermal Management & Server Density: Critical Issues for Today's Data Center," White paper, 2004, 8 pages.
Ranganathan et al., "Ensemble-level Power Management for Dense Blade Servers," In ISCA 2006: Proceedings of the 33rd International Symposium on Computer Architecture, 2006, 12 pages.
Rasmussen, "Guidelines for Specification of Data Center Power Density," APC White Paper 120, 2005, 21 pages.
Sandoval and Soria, "A Primer on Power Factor Correction," Jun. 1, 2004, EC&M, Retrieved from the Internet: http://APrimerOnPowerFactor.mht, 5 pages.
Sanmina-Sci-Ecobay Product Sheet, "High-Performance Closed-Loop System," 2006, 2 pages.
Sawyer, "Calculating Total Power Requirements for Data Centers," White Paper 3. Revision 1, 2011, 10 pages.
Shankland, 'cNet News.com' [online]. "Sun Blackbox, meet APC's whitebox," Jan. 7, 2007, http://news.com.com/Sun+Blackbox%2C+meet+APCs+whitebox/2001-1010_3-617774.html, 2 pages.
System Management Interface Forum, "PMBus Power System Management Protocol Specification Part 1—General Requirements, Transport and Electrical Interface, Revision 1.0," Mar. 2005, 17 pages.
Terhune, "Principles for Efficient and Reliable Reactive Power Supply and Consumption," United States of America Before the Federal Energy Regulatory Commission, Mar. 8, 2005, 5 pages.
Turner IV et al., "Tier Classifications Define Site Infrastructure Performance," White Paper: The Uptime Institute, 2006, pp. 1-17.

* cited by examiner

SUPPLYING GRID ANCILLARY SERVICES USING CONTROLLABLE LOADS

CROSS-REFERENCE TO RELATED APPLICATIONS

This application is a continuation of and claims priority under 35 U.S.C. §120 to U.S. application Ser. No. 12/484,999, filed on Jun. 15, 2009, the entire contents of which are hereby incorporated by reference.

TECHNICAL FIELD

The present disclosure relates generally to supplying grid ancillary services using controllable loads.

BACKGROUND

An electrical grid is an interconnected utility network for delivering power from suppliers to tens of thousands or millions of consumers. The electrical grid generally supports electricity generation, transmission, and distribution and includes multiple power plants operated by one or more suppliers, a transmission and distribution system, and many loads of the end user consumers. A grid operator will coordinate the supply of power on the grid to approximately match the overall load. Grid operators use a variety of ancillary services to achieve the balance of generation and load. The regulation ancillary service is the fastest-responding and most valuable service and offers the grid operator the ability to remotely control generation (or load) up and down within contract limits.

SUMMARY

In general, in one aspect, a method includes determining a desired power draw for a plurality of loads connected to an electrical grid, each of the plurality of loads connected to the electrical grid through a load supply control and being able to obtain a desired amount of energy from the grid in a desired time period, and transmitting a plurality of instructions through a communication network to a plurality of load supply controls to cause at least some of the loads in the plurality of loads to receive power from the electrical grid at different rates than other loads of the plurality of loads such that the desired power draw is obtained and such that each load of the plurality of loads receives its corresponding desired amount of energy in the desired time period.

This and other embodiments can optionally include one or more of the following features. The communication network can be the Internet. The plurality of loads can include a plurality of batteries or battery chargers, a plurality of hot water heaters, a plurality of refrigeration compressors, a plurality of dishwashers, a plurality of clothes dryers, a plurality of ice makers, or a plurality of swimming pool pumps. The plurality of batteries or battery chargers can include a plurality of batteries or battery chargers for plug-in vehicles.

The method can further include determining, for each load, a rate of power draw required for the load to obtain its desired amount of energy in the desired time period. The desired amount of energy and the desired time period can be based upon user input.

Transmitting a plurality of instructions can include transmitting first instructions to a first load to turn power to the first load on and transmitting second instructions to a second load to turn power to the second load off. Further, transmitting a plurality of instructions comprises transmitting first instructions to a first set of loads to reduce power to the first set of loads and transmitting second instructions to a second set of loads to increase power to the second set of loads.

The method can further include communicating with the plurality of load supply controls to register the loads for aggregation. The desired power draw can be calculated based upon short-term fluctuations of supply and demand on the electrical grid. The desired power draw can be calculated based upon long-term fluctuations of supply and demand on the electrical grid.

Determining a desired power draw can include receiving a control signal from an operator. The control signal can be based upon a variation between a supply and a demand on the electrical grid. The control signal can be received more than one time every ten seconds. Determining a desired power draw can include determining a scaling factor for the control signal. The scaling factor can be based upon historical data of control signals from the operator.

The method can further include determining a power variation capacity from the plurality of loads connected to an electrical grid. The power variation capacity can be determined to be between 0 and $2*\Sigma(E_i/t_i)$, wherein $E_i$ is the energy required for a load i, and $t_i$ is the time in which a load i must receive the energy. Further, the power variation capacity can be determined to be between 0 and $\Sigma(r_i)$, wherein $r_i$ is a maximum power draw for each load i.

Transmitting a plurality of instructions can include transmitting instructions to loads on the plurality of loads having a higher urgency value than other loads in the plurality of loads. The urgency value for each load can be determined based upon a percent of total connect time that the load has been connected, a true duty cycle, and a flexibility of a duty cycle. The duty cycle can be a ratio of a time that energy must be supplied to a total time that the load will be connected to the electrical grid.

In general, in one aspect, an apparatus includes a module configured to communicate with an aggregator through a communications network to register with the aggregator and to receive instructions from the aggregator through the communications network and a mechanism configured to increase or decrease power draw in response to the instructions.

This and other embodiments can optionally include one or more of the following features. The communications network can be the Internet. The apparatus can further include a user input configured to receive input corresponding to a desired energy draw and a desired time period from a user. The apparatus can further include software configured to convert the input into a required energy draw. The mechanism can be a switch. The mechanism can be configured to turn power to the load on or off in response to the instructions.

Certain implementations may have one or more of the following advantages. Appropriate control of power use over time can compensate for variations in power supply or demand elsewhere in an electrical grid. Further, such control of energy use can improve the stability of the electrical grid.

The details of one or more embodiments are set forth in the accompanying drawings and the description below. Other features, aspects, and advantages will become apparent from the description, the drawings, and the claims.

DETAILED DESCRIPTION

Power grids are generally controlled to operate at a nearly constant frequency, for example of 60 cycles per second in the United States, by continually adjusting power generation to be in balance with the total load. Normal and unpredictable variations between the supply and demand on a grid are usually compensated for by increasing or decreasing the power supply provided by various power plants. Such increases or decreases generally occur in response to a command from an operator. The current response to such commands, however, can be slow, require expensive capital equipment, and result in increased pollution. In contrast, distributing energy use among multiple loads over time can be a more effective, efficient, and inexpensive way of compensating for such fluctuations, and can react to such fluctuations more quickly.

Figure 1:
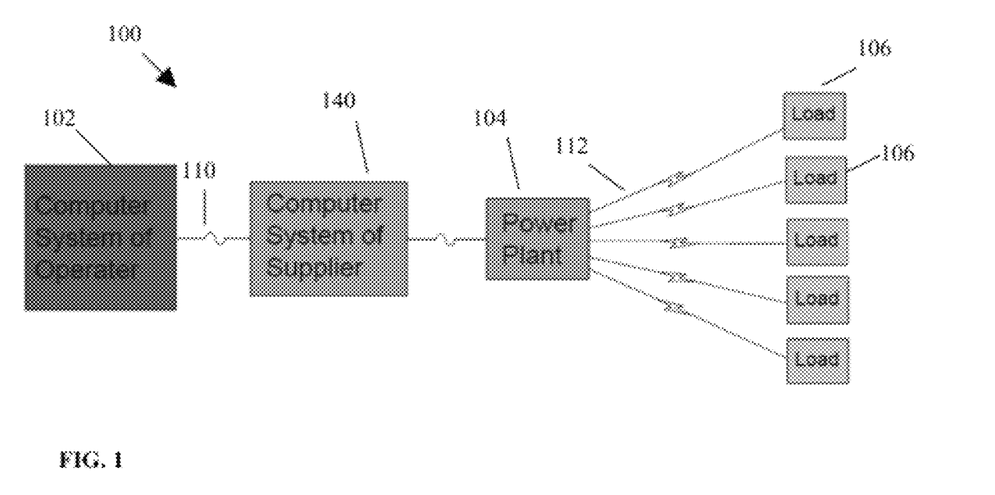
FIG. 1 is a schematic diagram of an electrical grid.

Referring to FIG. 1, a typical electrical grid 100 includes a power plant 104 operated by a supplier, such as an entity owning the power plant 104. The power plant 104 can be, for example, a fossil fueled power plant, a nuclear power plant, a solar thermal electric plant, a solar photovoltaic power plant, a hydroelectric power plant, or a wind turbine. The electrical grid 100 also includes a transmission and distribution system 112, e.g., high voltage transmission lines, transformers, and low voltage distribution wiring, to supply electrical power to loads 106 of the customers. The term "load" can refer to a particular power drawing electrical component, e.g., a battery charger, or to an overall machine that includes a power drawing electrical component, e.g., an electric or hybrid car that is plugged into a household electrical system to recharge a rechargeable battery inside the car.

The grid 100 is overseen by an operator that is responsible for managing the supply of power on the electrical grid. For example, the operator can be an entity, e.g., an Independent System Operator (ISO) or Regional Transmission Operator (RTO), that is part of, formed at the direction of, or authorized by a government regulatory agency, e.g., the Federal Energy Regulatory Commission (FERC), and is responsible for coordinating, controlling, and monitoring the operation of the electrical power system within a geographic region, e.g., a state or multiple states within the United States.

In operation of the electrical grid, the grid operator is responsible for coordinating the supply of power available to be in balance with the loads 106 in the electrical grid. The operator, or a computer system 102 of the operator, determines the amount of supply necessary and contracts with various suppliers to provide such power. In response to a periodic signal sent through a communication network 110, e.g., the Internet, from a computer system 102 of the operator, a computer system 140 of the supplier can increase or decrease the power generated by a power plant 104 supplied to the loads 106. That is, the power sent by the power plant 104 through the transmission and distribution system 112 to the electrical grid 100, and thus to the necessary loads 106, can be increased or decreased. Although only one computer system 140 and power plant 104 is shown in FIG. 1, multiple power plants operated by multiple suppliers can be, and are often, used.

During operation of the electrical grid, the amount of power supply available from the suppliers and the amount of power demanded by the customers can vary. Such variations can be short-term fluctuations, i.e. on the order of minutes, seconds, or less, or long-term variations, i.e. on the order of hours, days, or even months. Short-term variations in supply can result, for example, from a cloud passing over a solar panel or a generator changing its state. Short-term variations in demand can result, for example, from heavy industrial loads changing their state. In contrast, long-term variations in supply can result, for example, from diurnal changes in wind or solar power or from changing seasons. Long-term variations in demand can result from daily or seasonal behavior of customers, e.g., decreased demand at night when most residential customers are asleep.

In a typical electrical grid, fluctuations in the supply and demand balance are usually compensated for by a decrease or increase in the supply. To respond to short-term variations, the operator will send out commands every few seconds to various power plants providing ancillary services to increase or decrease the load. For example, regulation ancillary services, such as power plants, can respond to such demand within a couple of minutes. Further, spinning reserve is the extra supply available by increasing the power output of generators already providing power to the electrical grid. Such response can occur fairly rapidly, i.e. in less than a few minutes, but probably not in less than a minute. The non-spinning or supplemental reserve is the extra power supply available from those suppliers not already supplying energy but able do so after a longer time period or lag, e.g. on the order of 2-5 minutes. This generally includes hydroelectric and gas generators. Finally, the replacement reserve is reserve power provided by generators not already connected to the grid and having a longer start-up time, e.g. on the order of 30-60 minutes. The replacement reserve generally includes conventional generators, e.g. coal generators. To respond to long-term variations, the operator will send out commands on a longer scale to various ancillary services (a process called "demand response"). Response to variations in supply and demand by the suppliers, however, can be slow and have significant lag, require expensive capital equipment, and result in increased pollution.

Consumers of energy in some cases have some flexibility regarding exactly when the energy is consumed from the grid. Thus, rather than increasing or decreasing the supply in order to compensate for an imbalance in supply and demand in the electrical grid, the demand can be altered by controlling some of the load on the electrical grid.

Figure 2:
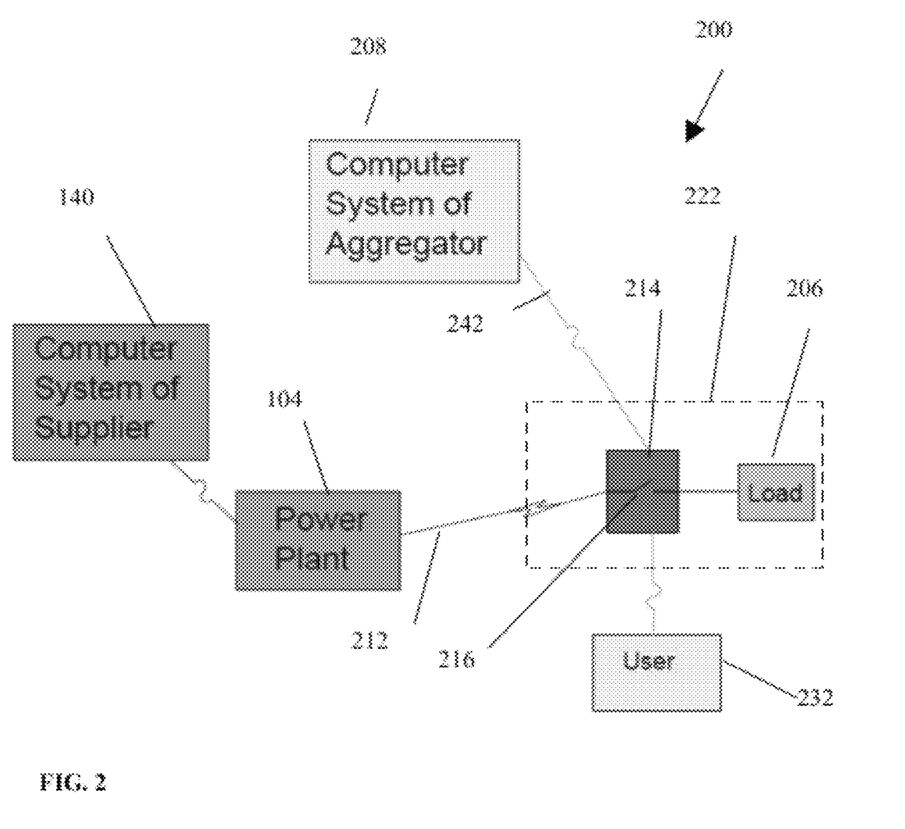
FIG. 2 is a schematic diagram of a portion of an electrical grid including a controllable load and an aggregator.

Referring to FIG. 2, a controllable load 206, i.e. a load capable of having its power draw increased or decreased (or turned on or off) as discussed herein, is part of an electrical grid 200. The grid 200 is similar to the grid discussed above, with one or more power plants 204 operated by one or more suppliers, and a transmission and distribution system 212 to supply electrical power to the controllable load 206. The controllable load 206 can be any load for which users of energy have flexibility regarding when the energy is consumed. In general, the controllable load will require sufficient energy to accomplish a certain task by a certain time, but need not be operated continuously. That is, the controllable load can require power for only a fraction of the entire time that it is expected to be attached to the electrical grid. For example, the controllable load can be an plug-in vehicle battery or battery charger, which may, for instance, be plugged in at night for 8 hours, but requires only 4 hours of drawing power in order to be fully charged. As other examples, the controllable load can be a hot water heater or a refrigeration compressor, each of which might demand sufficient energy to reach a certain temperature only by a certain time, but do not require power the entire time that they are attached to the electrical grid. As a further example, the controllable load can be a swimming pool pump, which might require sufficient energy to pump a certain volume of water through a filter by a certain time, but need not be operated continuously. Moreover, the controllable load can be a dishwasher, a clothes dryer, or an ice maker, each of which might require sufficient energy to complete the cycle by a certain time, but do not require power the entire time that they are attached to the electrical grid.

The controllable load 206 is connected to a transmission and distribution system 212 through a control module 214. The controllable load 206 and the control module 214 may be physically separate from one another, but may also be physically combined, as shown by box 222. For example, if the load is an plug-in vehicle with a rechargeable battery, the control module 214 can be a physically separate box which is plugged into the household electrical system and into which the electric car is plugged, or the control module 214 can be integrated into the plug-in vehicle. The former can be useful for adapting existing controllable loads to the aggregation system. The control module 214 further includes a mechanism, e.g. a switch 216, configured to turn power to the controllable load 206 on and off or, alternatively, to increase or decrease the power supplied to the controllable load 206.

The control module 214 further comprises a user input such that a user 232 can program in a desired charged state or desired amount of energy and a desired time period. Thus, for example, an owner of an plug-in vehicle might plug the vehicle into the electrical grid and input into the control module 214 that the vehicle must be fully charged within 8 hours. The control module 214 further includes a processor having software and/or firmware to communicate by conventional message protocols, e.g., TCP/IP, with a computer system 208 of an aggregator, as discussed below. The control module 214 can be connected by wired or wireless to a local area network, such as a home LAN with a home computer.

The control module 214 is in communication with a computer system 208 of an aggregator. The computer system 208 of the aggregator can receive a signal through the communication network 242 from the control module 214 corresponding to the desired charged state or desired amount of energy and desired time period. As discussed further below, the computer system 208 of the aggregator can likewise send a signal through the communication network 242 to the control module 214 instructing the module to turn power to the controllable load 206 on or off, or, alternatively, increase or decrease the power to a commanded value.

Figure 3:
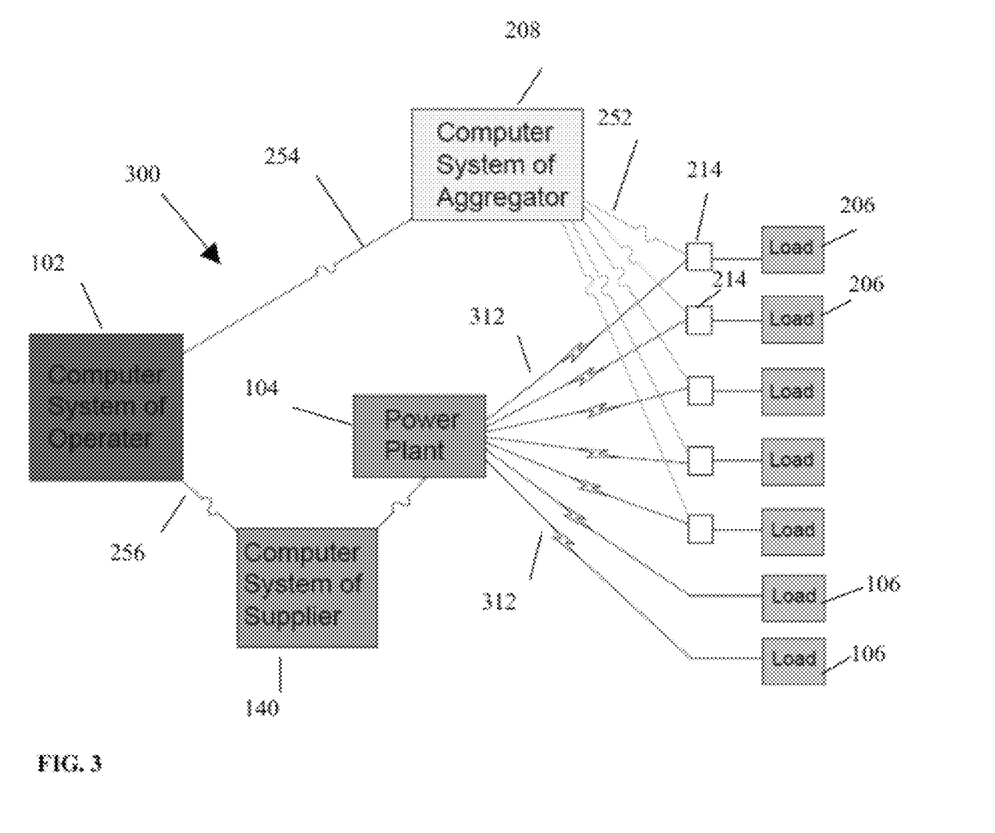
FIG. 3 is a schematic diagram of an electrical grid including an aggregator.

Referring to FIG. 3, multiple controllable loads 206 in the electrical grid 300 are data communication with a computer system 208 of an aggregator through a corresponding control module 214. Each control module 214 is in two-way communication through a communication network 252, e.g., through conventional message protocols such as TCP/IP through the Internet, with the computer system 208 of the aggregator. Further, both the aggregator and the supplier are in two-way communication with the computer system 102 of the operator through communication networks 254, 256, e.g. through the internet. Communication between the operators, suppliers, aggregators, and controllable loads can automatically occur without manual input.

In operation, users of each load will register with the aggregator to allow the aggregator to turn a load on or off or to increase or decrease the load's power draw. Users might register, for example, by connecting with and sending a signal to an aggregator through a control module 214. Users may be motivated to register if there is a financial or societal advantage to doing so, for example if they receive a discounted utility rate or are paid by the aggregator.

When a controllable load 206 is plugged into the electrical grid 300 through the control module 214, the control module 214 can send a signal through communication network 252 to the computer system 208 of the aggregator. The signal can include the characteristics of the controllable load 206 corresponding to the amount of energy that will be necessary to get the controllable load 206 to its desired state in the desired time. For example, if the controllable load 206 is a battery charger and battery, the control module 214 will report the state of charge of the battery, the charging rate (i.e. the amount of power it will draw when turned on), the total energy needed to recharge the battery, how long the battery expects to be connected to the electrical grid, and what state of charge is desired in the battery when it disconnects. The module might have these characteristics pre-set, it might be able to obtain the information automatically from the load, or a user might input the information at the time of connection. In particular, a user might manually identify how much charge, e.g. the desired charged state, is needed by a particular time, e.g. the desired time. If the controllable load 206 is not a battery, but rather is an alternative load, e.g. a water heater, the user or the load itself might communicate the average amount of energy needed by hour or day and the power draw when the load is turned on.

As discussed more below, the aggregator or the computer system 208 of the aggregator can assess the power draw potential of the all of the controllable loads 206 based upon the signals from each load 206. A signal can be sent from the computer system 208 of the aggregator through the communication network 254 to the computer system 102 of the operator relaying the draw potential, i.e. relaying the amount of energy that the computer system 208 of the aggregator can possibly provide to the computer system 102 of the operator.

The computer system 102 of the operator can send a signal through the communication network 256 to the computer system 140 of the supplier to provide power from the power plant 104 through the transmission and distribution system 312 to the controllable loads 206 and the noncontrollable loads 106. Further, if there is an imbalance in the supply and demand on the electrical grid, the operator can send a demand request or signal through the communication network 254 to the computer system 208 of the aggregator including a desired power draw from the controllable loads 206, i.e. an amount of power that the operator needs to obtain from the controllable loads 206 in order to balance the overall supply and demand on the electrical grid. Alternatively, the aggregator or computer system 208 of the aggregator might determine a desired power draw itself based upon fluctuations in the supply and demand and/or changes in the grid frequency, which indirectly indicate imbalance of supply and demand.

The computer system 208 of the aggregator can send signals through the communication network 252 to the modules 214 of the controllable loads 206 to turn power drawn by the loads on or off, or, alternatively, to increase or decrease the power draw by the controllable loads 206. Thus, the aggregator or computer system 208 of the aggregator can control the charging or power drawn by the controllable loads 206 under remote control. The coordinated control of loads on the electrical grid on a short time-scale provides "regulation" ancillary services to the grid operator. The coordinated control of loads on the electrical grid can also provide demand response on a longer time scale. The aggregator is likely to be motivated to perform such ancillary services because it will receive payment from the grid operator for providing the service. The aggregator can command a potentially large number of controllable loads, thereby having the potential to balance out large changes in supply as might be experienced with intermittent renewable generation sources such as wind and solar.

In order to successfully provide ancillary services while meeting the energy needs of each load, the aggregator or computer system 208 of the aggregator must ensure two things: (1) that each of the controllable loads 206 reaches its desired energy need or desired charged state by the desired time and (2) that the operator receives its desired power draw upon command. There may be some loads that will require power the entire time that they are attached to the grid. Likewise, other controllable loads 206 may not require any power while connected to the grid. The remaining loads can be cycled on and off, or the power cycled up and down, to achieve a specific and usually time-varying total power draw from the electrical grid.

To make a regulation ancillary service offering to the grid operator, the aggregator or computer system of the aggregator must predict in advance how much power capacity is available. This is expressed in terms of the amount of power deviation that the aggregator or computer system of the aggregator can dispatch above or below a baseline load value. The baseline load value is called the preferred operating point, or POP. In the case of the aggregated controllable loads, the power capacity will be a function of the number of loads and the individual load characteristics and status (e.g. initial state of charge).

For example, each of the controllable loads 206 can be a battery charger and battery, e.g. for a plug-in vehicle. As noted above, the load characteristics of a plug-in vehicle include the state of charge of the battery, the maximum charging rate (i.e. the amount of power it will draw when turned on), the total energy needed to fully recharge the battery, how long the vehicle expects to be connected to the electrical grid, and what state of charge is desired in the battery when it disconnects.

To provide regulation, i.e. response to short-term fluctuations, the aggregator or computer system of the aggregator can estimate of the amount of power modulation achievable by the aggregator or computer system of the aggregator from the controllable loads for any interval, called the assessment interval, during which some loads, called the active ensemble or managed ensemble of loads, are connected or can reasonably be expected to be connected. For this example, it is assumed that the aggregator or computer system of the aggregator can signal the loads to turn only on or off. However, the aggregator or computer system of the aggregator has the potential to continuously adjust the power drawn by each load rather than turning the loads on and off. This would allow the aggregator or computer system of the aggregator an additional degree of freedom in scheduling the power distribution to the loads. With strictly on/off capabilities, the aggregator or computer system of the aggregator needs to cycle the loads to maintain them as a resource of as long as possible, somewhat increasing the communication overhead with the modules. If a load could simply be set to receive power at its average rate, then the module associated with the load would then only need to be communicated with in response to swings in the regulation signal that required the load's involvement in increasing or decreasing the aggregate load.

In order to estimate the amount of regulation available for an active ensemble of loads for the assessment interval, the aggregator or computer system of the aggregator must determine the preferred operating point, or the nominal rate of power draw that must be achieved by the aggregated controllable loads in order to meet the energy needs of each load within the available elapsed time for each load.

In the context of charging batteries, e.g., of plug-in vehicles, one method of determining the preferred operating point is to assume that charging is to be carried out for as long as possible (i.e. until the vehicle will be disconnected from the grid). To do so, the average charge rate is determined for each load in the active ensemble of loads such that each battery pack reaches the desired state of charge when the vehicle will be disconnected from the grid. This average charge rate is the amount of energy needed by the load divided by the expected connect time. The duty cycle, or the ratio of the charging on-time required to achieve the averaged charged rate to the total time plugged in to the electric grid is computed. Loads with a duty cycle greater than or equal to 1.0, called drone loads, cannot contribute to the regulation because they require more energy than can be provided in the time that they are connected to the electrical grid even at full charging power. The preferred operating point is the sum of all the individual calculated vehicle average loads excluding the drone loads. The preferred operating point calculation is shown in Equation 1, wherein $O_{time}$ is the preferred operating point for providing regulation over the entire time, $E_i$ is the energy required for a load i (excluding the drone loads), and $t_i$ is the time in which a load i must receive the energy from the grid (excluding the drone loads).

$$O_{time} = \Sigma(E_i/t_i) \quad \text{(Equation 1)}$$

This summation yields the preferred operating point assuming that aggregator wanted to extend the regulation service as long as possible given the current ensemble of loads. Starting from the baseline load of the preferred operating point, the aggregator or computer system of the aggregator can choose to add more or less power draw from the controllable loads. As discussed below, such an increase or decrease can provide a regulation ancillary service to the operator.

Another method of determining the operating point is to assume that the largest regulation capacity is to be provided, rather than to assume that the regulation is to be distributed over the longest duration. In this case, the aggregator or computer system of the aggregator may choose the preferred operating point to be half the total maximum charge rate $L_{max}$ (Equation 2) of all controllable loads, rather than the average determined above as the bid value. This allows the regulation power range to be from zero to the maximum load, with the preferred operating point being halfway between zero and the maximum load. This method is shown by Equation 3, wherein $O_{max}$ is the maximum regulation signal for each load i and $r_i$ is each load's corresponding maximum charge rate:

$$L_{max} = \Sigma(r_i) \quad \text{(Equation 2)}$$

$$O_{max} = 0.5 * L_{max} \quad \text{(Equation 3)}$$

This summation yields the operating point that could be used assuming that the aggregator wanted to provide the grid operator the largest possible regulation capacity in the near term. This might be desirable based on pricing of regulation ancillary services at different times of day.

Note that the two different methods of determining the operating point discussed above depend upon two different methods of determining the charge rate of each load. In Equation 1, the rate of power supply for each load (E/t) is set by the user, i.e. based upon the desired charged state and the desired time. In contrast, in Equation 2, the rate of power supply for each load (r) is set by the inherent characteristics of the load itself, i.e. based upon the maximum power that each load can possibly attain.

As a particular example, suppose that we had 125 loads connected and that each one required 10 kWh of energy. Suppose that they were each to be connected for 12 hours, and that they consumed energy at a rate of 2 kW each when turned on. In order to reach their energy goal, each load would need to be on for a total of 5 hours during the 12-hour connect time. The duty cycle for such a load would be 5/12, and the average power rate for each load would be 10 kWh/12 hrs, or 5/6 kW. The aggregated average would be 125*5/6 kW. This aggregated average would be the operating point for the regulation service ($O_{time}$) if the operator were to make a conservative estimate and assume that the regulation was to be spread out over the maximum time. However, if the aggregator wanted to provide the maximum possible regulation, then the regulation operating point could be set up to a maximum of 0.5*125*2 kW.

It is also possible to use any value intermediate between these extremes as the operating point, depending upon the physical need for regulation and the economics of regulation duration vs. regulation magnitude. This capability can be used to bias the preferred operating point to follow long term variations in renewable generation or predictable load changes.

Assuming that the aggregator has an ensemble of loads as described above, and assuming the estimate of the ensemble's regulation potential is large enough to be of interest to be marketable, the aggregator could establish a contract with the grid operator to provide a certain amount of regulation capacity, R, which is the maximum amount of load power range available above or below the preferred operating point that the aggregator or computer system of the aggregator has determined to be available. In this scenario, R is also the operating point for the aggregator or computer system of the aggregator (i.e. the aggregator or computer system of the aggregator can adjust the load ensemble to draw anywhere between 0 and 2*R in response to signals from the grid operator). Note, however, that if the operating point is chosen such that 2*POP would be greater than the peak power available from the loads, then the operating point used for determining the regulation capacity R would have to be set at the peak power minus POP.

If the operating point is set as $O_{max}$, the aggregator is guaranteed to be able to handle a peak-to-peak change in demand of 0 to 2R for at least some interval of time, assuming that the regulation capacity is symmetrical. On the other hand, if the operating point is set at $O_{time}$, it is statistically probable that the aggregator can handle a peak-to-peak change in demand of 0 to 2R for a longer period of time, provided one assumes that, over all loads, the average duty cycle is 50%. Of course, as the aggregator gains experience handling large number of loads, the latter assumption may need to be adjusted. For instance, if most loads were fully discharged electric vehicles that require an 80% duty cycle to get charged in time, then the average draw (the operating point) would be $0.8*\Sigma(r_i)$ for all loads i, but the amount of up and down regulation would not be symmetrical about that point. Thus, the regulation capacity does not have to be a single value, i.e. symmetrical about the operating point. Rather, it may be possible to bid in separation amount of regulation on either side of the operating point.

In the example given above, assuming that the aggregator wished to provide symmetrical regulation, the aggregator or computer system of the aggregator could be conservative and use $O_{time}$ as the operating point, thereby offering the operator a minimum of 0 kW of load and a maximum of 2*125*5/6 kW of load. Alternatively, the aggregator or computer system of the aggregator could use $O_{max}$ as the operating point and offer the operator a minimum of 0 kW and a maximum of 2*0.5*125*2 kW of load.

After the aggregator or computer system of the aggregator has predicted how much power capacity is available and has offered, or bid on, a particular amount of regulation, R, the operator or computer system of the operator can accept or reject the bid. If the bid is accepted, the operator will send a regulation signal to the aggregator or computer system of the aggregator representing a desired power draw.

The regulation signal can correspond to the amount of increase or decrease in power that the operator or computer system of the operator desires the particular aggregator to provide. In this case, the operator or computer system of the operator only sends requests to the aggregator or computer system of the aggregator for increases or decreases in power up to R. The total of all signals sent to various aggregators or computer systems of aggregators is then equivalent to the total amount of desired regulation.

Alternatively, the operator or computer system of the operator can send the full automatic generation control (AGC) signal, representing the total increase or decrease in power generation required by the operator from all aggregators. If the operator or computer system of the operator sends the full AGC, the aggregator or computer system of the aggregator must determine how much of the regulation should be provided by the aggregator. To do so, the aggregator or computer system of the aggregator can determine a scaling factor, a, based upon the historical maximum and minimum AGC, as shown by Equation 4:

$$a = 2*R(AGC_{min} - AGC_{max}) \qquad \text{(Equation 4)}$$

where $AGC_{min}$ is the minimum historical signal, $AGC_{max}$ is the maximum historical signal, and b is the operating point. The scaling factor is chosen such that the maximum expected excursion of the AGC is scaled to have a peak-to-peak range of 2R. Calculating the scaling factor based upon Equation 4 assumes that the operator is sending the signal to aggregators or computer systems of the aggregators with a total power regulation that matches $AGC_{min}-AGC_{max}$. Further, in the above equation, the sign of a is negative, as the load will be decreased when the operator requests more generation and increased when the operator or computer system of the operator requests less generation. Equation 4 can also be used by the operator or computer system of the operator if, as discussed above, the operator sends a regulation request to each aggregator or computer system of the aggregator representing what the operator wants that particular aggregator to provide.

For the duration of the assessment interval, the aggregator or computer system of the aggregator will dispatch a load L, where L is the load required in the next cycle, i.e. before the next AGC signal is sent by the operator or computer system of the operator, to the operator based upon the scaling factor, the AGC at a particular time, the historical mean AGC, and the operating point POP, as shown in Equation 4:

$$L = a*(AGC(t) - AGC_{mean}) + POP \qquad \text{(Equation 5)}$$

where AGC(t) is the AGC requested at time t, $AGC_{mean}$ is the operator's historical mean AGC. The operating point POP can be greater than or equal to $O_{time}$ and less than or equal to $O_{max}$.

For each new demand signal sent by the operator at time t and in time increments T, the aggregator or computer system of the aggregator must compute not only the load L, but also check for new loads connecting or old loads disconnecting. For each controllable load connected to the electrical grid at the time t, the load or control module of the load can report to the aggregator or computer system of the aggregator the energy-sink capacity of the load Eb, the energy content of the load Ec, the desired energy content at the end of the connection interval Ed, the power draw state (on or off), the expected connection interval D, the maximum power draw pl, and the connection time $t_i$. The aggregator or computer system of the aggregator can then determine the average power requirement for each load during its expected connect time must be determined. Alternatively, the load or load control module can calculate the average power requirement and report it to the aggregator or computer system of the aggregator.

For each load connected, the aggregator or computer system of the aggregator can determine the duty cycle dc, or the ratio of the charging on-time required to achieve the average charged rate to the total time plugged in to the electric grid, as shown in Equation 6:

$$dc=(Ed-Ec)/(D*pl) \qquad \text{(Equation 6)}$$

If the duty cycle is greater than or equal to one, then the load cannot be regulated. Rather, it must be turned on and left on because it requires more energy than can be provided in the time that it is connected to the electrical grid even at full charging power (called a "drone load"). Further, if the duty cycle is less than or equal to 0, then the load cannot be regulated because it cannot draw power.

Every load having a duty cycle greater than zero and less than one can be included in the managed ensemble of loads, i.e. those loads from which regulations can be obtained. Conversely, each load that reaches its energy goal Ed or physically disconnects from the electrical grid is removed from the managed ensemble of loads.

The aggregator or computer system of the aggregator can calculate an urgency value for each load in the managed ensemble of loads at time t. The urgency can provide a ranking of a load's need to be serviced. For example, the urgency can be based upon the fraction of total time that the load has already been connected, how close the load has been operating to the desired duty cycle (called the "true duty cycle"), and how flexible the duty cycle is. Thus, if a desired duty cycle is close to zero or one, then the load needs to be watched more closely than one with a duty cycle of 0.5. Further, if the true duty cycle is far from the desired duty cycle, it needs to be corrected sooner than one that is closer to the desired value. Further, if a load has been connected for a small fraction of its expected connection interval, then it needs less attention than one that has been connected for a while. An exemplary method of calculating the urgency cycle is shown in Equation 7:

$$U=(dur/(dur+D/10))*(dc-tdc)/\min(dc,1-dc) \qquad \text{(Equation 7)}$$

wherein $dur=t-t_i$, $tdc=$the fraction of time that the load has been on. Further, the denominator, $\min(dc, 1-dc)$ is chosen because it reaches a maximum when the duty cycle is 0.5 (and hence the load is most flexible). That is, $\min(dc, 1-dc)$ will get smaller as the duty cycle approaches 0.0 or 1.0, thereby increasing the urgency. The urgency can also be, for example, a nonlinear function based upon these variables. Additionally, other variables could be included in the urgency calculation. For example, a hybrid plug-in vehicle might be less urgent than an electric plug-in vehicle.

Although the aggregator or computer system of the aggregator might continuously communicate with a load to obtain its current information, the computer system 208 can also create a shadow model by which it approximates the load's behavior. Thus, the aggregator or computer system of the aggregator can communicate with the load only when the load requires action, i.e. requires more or less power. The urgency of the load being serviced can therefore be assessed without actually communicating with the load.

The loads in the managed ensemble of loads can be switched based upon their urgency value. To do so, the aggregator or computer system of the aggregator can compute the total amount of power that must be added or subtracted in the next cycle, i.e. in the time between AGC signals, to reach the desired power draw. This value, ΔP, can be determined by subtracting the dispatched power Pd, i.e. the power that the aggregator provided to the operator in the last cycle, from the load L, as shown in Equation 8:

$$\Delta P=L-Pd \qquad \text{(Equation 8)}$$

If more loads need to be turned on, i.e. if ΔP is greater than zero, then the aggregator or computer system of the aggregator can turn on loads that are off and have high urgency (i.e. loads with large positive values of U will be serviced first). Alternatively, if more loads need to be turned off, i.e. if ΔP is less than zero, then the aggregator or computer system of the aggregator can turn off loads that are on and have high urgency (i.e. loads with large negative values of U will be serviced first). The aggregator or computer system of the aggregator can thus scan the list and turn on those with high urgency that can accommodate the load. The aggregator or computer system of the aggregator can stop scanning when ΔP has been met. The aggregator or computer system of the aggregator can repeat these steps at each cycle, i.e. at each updated of the AGC signal, to continually track its chances and also to account for any changes in the load ensemble as new loads join or as old loads leave the ensemble.

Optionally, a load may also choose not to be controlled by the aggregator or computer system of the aggregator, i.e. the load might decide to be on or off despite receiving instructions to the opposite from the aggregator or computer system of the aggregator. The aggregator or computer system of the aggregator can then readjust its ΔP based on the loss of a managed load.

In a typical real-world scenario, loads will be connecting and disconnecting at various times during the day. For instance, if we consider batteries to electric vehicles to be the loads, many loads will be connecting as people return home form work, and these same electric vehicles will be disconnected as the owners commute to and from work. The aggregator or computer system of the aggregator can reassess the regulation capacity on a regular basis, such as once per hour, offering more or less regulation service to the grid operator based upon load availability.

In addition, there may be preferred times during the day when loads would have their energy requirements satisfied. Typically, the grid has less overall load at night, while the availability of wind resources is generally higher at night. Alternatively, in some areas where solar power is being added to the grid, there may be times during the day when the loads would be well utilized. Thus, the aggregator or computer system of the aggregator may choose, where possible, to adjust the preferred operating point POP to follow these predictable longer-term grid supply/demand variations.

Although the examples described herein are with reference to the charging of batteries for plug-in-vehicles, the same method can be used for aggregating any set of controllable loads. Further, although the examples herein are with reference only to using controllable loads to respond to regulation, or short term variation, the aggregated loads can also be used to help compensate for long term variations. Both of these types of responses can be marketable services, providing potential source of revenue for the aggregator and/or electricity rate savings for the owners of the loads.

Particular embodiments have been described. Other embodiments are within the scope of the following claims.

What is claimed is:

1. A system comprising an aggregator configured to:
   communicate with a plurality of modules through a communications network to register the modules with the aggregator, wherein each of the modules is associated with a corresponding load connected to an electrical grid, each load needing a total amount of energy to complete a particular task by a specific time;
   determine a total desired power draw for the plurality of loads;
   determine instructions for the modules, wherein the instructions are configured to cause the modules to increase or decrease power draws of the loads in response to the instructions such that that the desired power draw is obtained and that each of the loads receives the corresponding total amount of energy to complete the particular task by the specified time; and,
   send the instructions to the modules such that the modules increase or decrease power draws of the loads in accordance with the instructions.

2. The system of claim 1, wherein the communications network is the Internet.

3. The system of claim 1, further comprising a plurality of module inputs configured to receive inputs corresponding to the total amounts of energy from the modules.

4. The system of claim 1, further comprising a plurality of module inputs configured to receive inputs corresponding to the specified times from the modules.

5. The system of claim 1, further comprising software configured to convert a plurality of inputs corresponding to the specified times and a plurality of inputs corresponding to the total amounts of energy into the total desired power draw.

6. The system of claim 1, wherein the instructions are configured to cause one or more of the modules to turn power on or off to the corresponding loads.

7. A method comprising:
   determining, by a load supply control associated with a load connected to an electrical grid, a total amount of energy for the load to complete a particular task by a specified time;
   transmitting, by the load supply control to an aggregator through a communication network, information indicating the specified time and the total amount of energy;
   receiving, at the load supply control, instructions through the communication network from the aggregator;
   in response to receiving the instructions, controlling, by the load supply control, the associated load to cause the load to receive power from the electrical grid at a different rate than other loads connected to the electrical grid such that a total desired power draw of the load and other loads is obtained and such that the load receives the total amount of energy to complete the particular task by the specified time.

8. The method of claim 7, wherein the communication network is the Internet.

9. The method of claim 7, wherein the load comprises a battery or battery charger, a hot water heater, a refrigeration compressor, a dishwasher, a clothes dryer, an ice makers, or a swimming pool pump.

10. The method of claim 9, wherein the battery or battery charger comprises a battery or battery charger for a plug-in vehicle.

11. The method of claim 7, wherein the total amount of energy is based upon user input.

12. The method of claim 7, wherein the specified time is based upon user input.

13. The method of claim 7, wherein the total amount of energy is automatically determined by the module.

14. The method of claim 7, wherein the specified time is automatically determined by the module.

15. The method of claim 7, wherein the plurality of instructions comprises first instructions to turn power to the load on, and second instructions to turn power to the load off.

16. The method of claim 7, wherein the plurality of instructions comprises first instructions to increase power to the load, and second instructions to decrease power to the load.

17. The method of claim 7, further comprising communicating with the aggregator to register the load supply control for aggregation.

18. The method of claim 7, further comprising determining an urgency value for the load, and transmitting instructions descriptive of the urgency value to the aggregator.

19. The method of claim 7, wherein the urgency value the load is determined based upon a percent of total connect time that the load has been connected, a true duty cycle, and a flexibility of a duty cycle.

20. The method of claim 19, wherein the duty cycle is a ratio of a time that energy must be supplied to a total time that the load will be connected to the electrical grid.

* * * * *